(12) United States Patent
Schwarz et al.

(10) Patent No.: US 6,230,854 B1
(45) Date of Patent: May 15, 2001

(54) DISC BRAKE WHICH CAN BE ACTUATED ELECTROMECHANICALLY

(75) Inventors: Ralf Schwarz; Peter Kilian, both of Darmstadt; Martin Semsch, Butzbach; Holger Kranlich, Karben; Stefan Schmitt, Eltville, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/331,020

(22) PCT Filed: Dec. 3, 1997

(86) PCT No.: PCT/EP97/06761

§ 371 Date: Sep. 22, 1999

§ 102(e) Date: Sep. 22, 1999

(87) PCT Pub. No.: WO98/27357

PCT Pub. Date: Jun. 25, 1998

(30) Foreign Application Priority Data

Dec. 16, 1996 (DE) ............................................. 196 52 230

(51) Int. Cl.[7] ...................................................... F16D 65/36
(52) U.S. Cl. .......................... 188/156; 188/157; 188/161; 188/162; 303/DIG. 3
(58) Field of Search .................................. 188/156, 162, 188/157, 161; 303/DIG. 3

(56) References Cited

U.S. PATENT DOCUMENTS

| 4,334,602 | * | 6/1982 | Armour et al. ....................... 192/103 |
| 4,623,044 | | 11/1986 | Ohta et al. . |
| 4,784,244 | * | 11/1988 | Carre et al. ........................... 188/156 |
| 4,805,740 | * | 2/1989 | Wilke et al. .......................... 188/173 |
| 4,850,457 | * | 7/1989 | Taig ...................................... 188/72.1 |
| 4,995,483 | * | 2/1991 | Moseley et al. ...................... 188/162 |
| 5,090,518 | * | 2/1992 | Schenk et al. ........................ 188/72.1 |
| 5,107,967 | * | 4/1992 | Fujita et al. .......................... 188/72.1 |

(List continued on next page.)

FOREIGN PATENT DOCUMENTS

| 21 28 169 | 12/1972 | (DE) . |
| 195 11 287 | 1/1996 | (DE) . |
| 195 08 253 | 9/1996 | (DE) . |
| 195 09 065 | 9/1996 | (DE) . |
| 0 743 470 | 11/1996 | (DE) . |
| 0 295 770 | 12/1988 | (EP) . |
| 0 394 238 | 6/1992 | (EP) . |
| 63-242764 | 10/1988 | (JP) . |

OTHER PUBLICATIONS

Search Report of the German Patent Office for Application No. 196 52 230.7.
Balz, Jürgen, article titled "Konzept für eine electromechnische Fahrzeugbremse" in magazine ATZ Automobiltechnische Zeitschrift 98, 1996, issue 6, pp. 328–333.

*Primary Examiner*—Christopher P. Schwartz
*Assistant Examiner*—Benjamin A. Pezzlo
(74) *Attorney, Agent, or Firm*—Rader, Fishman & Grauer PLLC

(57) ABSTRACT

The present invention discloses an electromechanically operable disc brake for automotive vehicles which comprises a floating caliper as well as an actuating unit arranged on the caliper. The actuating unit includes an electric motor which, by the intermediary of a reduction gear, readjusts an actuating element which is used to move one of two friction linings that are slidable in the brake caliper into engagement with a brake disc.

To permit an individual adjustment of the desired brake force, especially for use of the disc brake in an automotive vehicle, according to the present invention, a force-measuring device (23) is interposed in the flux of force between the caliper (1) and the actuating unit (2), and the output signals of device (23) are adapted to be sent to a control circuit (26) that influences the current supplied to the electric motor (6), and/or the voltage.

21 Claims, 3 Drawing Sheets

U.S. PATENT DOCUMENTS

| | | | | |
|---|---|---|---|---|
| 5,286,094 | * | 2/1994 | Milner | 303/7 |
| 5,860,494 | * | 1/1999 | Nishizawa | 188/73.35 |
| 5,915,504 | * | 6/1999 | Doricht | 188/72.1 |
| 5,931,268 | * | 8/1999 | Kingston et al. | 188/162 |
| 5,971,110 | * | 10/1999 | Martin | 188/72.1 |
| 6,003,640 | * | 12/1999 | Ralea | 188/71.5 |
| 6,008,604 | * | 12/1999 | Maisch | 318/362 |
| 6,040,665 | * | 3/2000 | Shirai et al. | 318/14 |

* cited by examiner

DISC BRAKE WHICH CAN BE ACTUATED ELECTROMECHANICALLY

The present invention relates to an electromechanically operable disc brake for automotive vehicles which includes a brake caliper, as well as an actuating unit arranged on the brake caliper, two friction linings which cooperate with each one lateral surface of a brake disc and are arranged in the brake caliper so as to be displaceable within limits, wherein one of the friction linings is directly movable into engagement with the brake disc caused by the actuating unit by way of an actuating element, and the other friction lining is movable into engagement with the brake disc by the effect of a reaction force generated by the brake caliper, and wherein the actuating unit includes an electric motor that is arranged coaxially relative to the actuating element and a reduction gear interposed between the motor and the actuating element in terms of effect.

An electromechanically operable disc brake of this type is disclosed in European Patent No. 0 394 238, for example. The actuating unit of the prior art disc brake includes an electric motor which cooperates with a planetary gear having planet wheels which drive a ring wheel. The rotation of the ring wheel is transmitted by way of bearing means onto an actuating sleeve, or causes axial displacement of the sleeve by which the friction lining associated with the actuating unit is moved into engagement with the brake disc. The electric motor and the planetary gear are arranged side by side in the actuating direction of the disc brake. The prior art electromechanically operable disc brake suffers especially from the disadvantage that when equipping an automotive vehicle, wherein at least two brakes of this type are integrated in a control circuit, it is impossible to associate a defined value of the clamping force applied to the linings with the control quantity 'electric current supplied to the electric motor'. Uneven brake torques on the vehicle axles result therefrom due to the fluctuating mechanical efficiency.

An object of the present invention is to improve upon an electromechanically operable disc brake of the above-mentioned type to such effect that, when it is used in a control circuit, a defined allocation between the clamping force and the electric current supplied to the electric motor is achieved.

This object is achieved by the present invention because a force-measuring device is interposed in the flux of force between the actuating element and the friction lining associated therewith, and the output signals of the force-measuring device are adapted to be sent to a control circuit which influences the current supplied to the electric motor and/or the voltage. These provisions permit a control of the required brake force on each individual wheel.

In preferred embodiments of the object of the present invention, the force-measuring device is arranged in the caliper or in a bearing in which the reduction gear is mounted and which accommodates the clamping force produced by the actuating unit. Another possibility includes the arrangement of the force-measuring device between the actuating element and the friction lining associated with it, or between the brake caliper and the friction lining operable by the effect of the reaction force that is produced by the brake caliper.

To render the idea of the present invention more precise, the reduction gear has a threaded nut on which the force-measuring device is arranged.

In a preferred aspect of the object of the present invention, the force is transmitted between the reduction gear and the friction lining by way of a push rod on which the force-measuring device is arranged.

It is especially appropriate that the force-measuring device is configured as a force-measuring element which includes at least one wire strain gauge, or as a pressure gauge.

Further preferred aspects of the present invention become apparent from the subclaims 9 to 11 and 13 to 19.

In another preferred aspect of the present invention, the force-measuring device is arranged at the end of the spindle, preferably, is provided in a bottom which closes a through-bore of the spindle.

In a design variation of the present invention which has especially compact dimensions, the force-measuring device is provided by areas of the bottom having a reduced material thickness which cooperate with wire strain gauges to evaluate their deformation.

The present invention will be explained in detail in the following description of three embodiments, making reference to the accompanying drawings.

Figure 1:
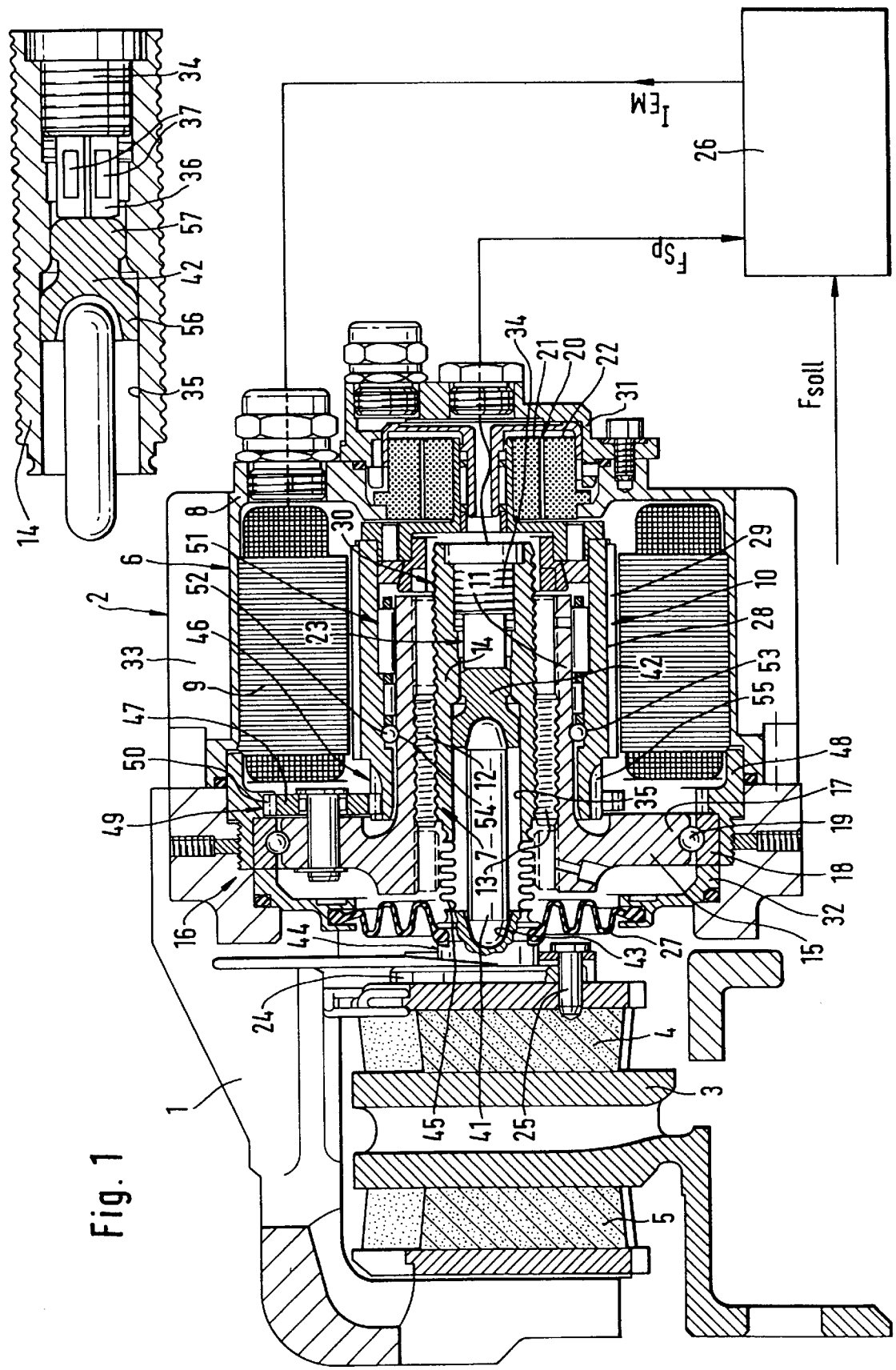
FIG. 1 is an axial cross-sectional view of a first embodiment of the electromechanically operable disc brake of the present invention.

The electromechanically operable disc brake of the present invention shown in the drawings, which is configured as a floating-caliper disc brake in the illustrated example, generally comprises a brake caliper 1 which is slidably mounted in a stationary holder means (not shown) and an actuating unit 2 having a housing 8 which is arranged on the brake caliper 1 by means of fastening elements (not shown). A pair of friction linings 4 and 5 is so arranged in the brake caliper 1 that they face the left and right lateral surfaces of a brake disc 3.

The friction lining 4 shown on the right-hand side in the drawing will be referred to as first friction lining, and the other friction lining designated by reference numeral 5 will be referred to as second friction lining.

While the first friction lining 4 is movable directly into engagement with the brake disc 3 by the actuating unit 2 by way of an actuating element 30, the second friction lining 5 is urged against the opposite lateral surface of the brake disc 3 by the effect of a reaction force generated upon actuation of the arrangement by the brake caliper 1.

The above-mentioned actuating unit 2 comprises an electric motor 6 which, in the embodiment shown, is configured as an electronically commutable (torque) motor which is energized by a permanent magnet. Stator 9 of the motor is immovably arranged in housing 8, and its rotor 10 or hollow shaft is configured as an annular holder means 28 which carries several permanent magnet segments 29. A reduction gear 7, which is configured as a roller-and-thread drive 11 to 14 in the embodiment shown, is interposed in terms of effect between the torque motor 6 and the above-mentioned actuating element 30 which is preferably arranged coaxially relative to the motor 6. The roller-and-thread drive comprises a threaded nut 11 and a threaded spindle 14 which includes a through-bore 35. Thread rollers 12, 13 are arranged paraxially in the threaded nut 11 and, upon rotational movement of the threaded nut 11, rotate like planets without axial displacement and set the threaded spindle 14 into axial movement. The thread rollers 12, 13 are guided radially by way of two guide washers and toothed rims (not shown) arranged at their ends.

Preferably, the arrangement is chosen so that the rotor 10 of the torque motor 6 is unrotatably connected to the threaded nut 11. The threaded spindle 14 forms the above-mentioned actuating element 30 which actuates the first friction lining 4 by the intermediary of a force-transmitting plate 24. Pressure forces are transmitted between the threaded spindle 14 and the force-transmitting plate 24, preferably by means of a push rod 41 which is arranged partly within the threaded spindle 14 and is mounted in two spherical segments 42, 43. The first spherical segment 42 is arranged roughly in the middle of the axial length of the threaded spindle 14, i.e., inside the area disposed between the thread rollers 12, 13. The second spherical segment 43 which is closer to the friction lining 4 is provided in an axial extension 44 of the force-transmitting plate 24. Further, a metallic pleated bellows 45 is arranged between the force-transmitting plate 24 or its extension 44 and the threaded spindle 14, or is welded with both parts, which provides an untorsional connection to transmit torsional moments that result from the clamping force generated by the threaded spindle 14. These provisions serve to minimize losses in efficiency which occur when the roller-and-thread drive is used and which are due to the great friction caused by moments acting upon the roller-and-thread drive.

Besides, an anti-rotation mechanism 25 is preferably provided between the force-transmitting plate 24 and the first friction lining 4. This mechanism is configured as a pin pressed into the friction lining 4 and received in a recess designed in the force-transmitting plate 24.

The reduction gear 7 and the hollow shaft or the rotor 10 are guided by a radial bearing 16 which is supported on the brake caliper 1. Bearing 16 comprises an outside bearing ring 18 which cooperates with the brake caliper 1, an inside bearing ring 17 which is formed of the circumferential area of a collar-type radial extension 15 of the threaded nut 11, and a plurality of balls 19 disposed between the two bearing rings 17, 18. The one-part design of the inside bearing ring and the threaded nut 11 permits achieving both a higher degree of operating precision and reduced manufacturing cost, as well as a modular type of construction.

In order to exactly position the roller-and-thread drive 7 and to produce control signals for the electronic commutation of the torque motor 6, a non-contact transducer, a so-called resolver 20, is provided in the housing 8 of the actuating unit 2. The resolver 20 in the embodiment shown is composed of two coaxial rings 21, 22 spaced from each other by an air slot and carrying electric coils. The radially inwardly disposed ring 21 is connected to the rotor 10, while the other one, the radially outside ring 22 is unrotatably arranged in the housing 8. The interior of the housing 8 is protected against contaminants, such as spray water, by a cover 31 fitted on the housing 8 in the area of the resolver 20, on the one hand, and by an elastic diaphragm-type seal 27, on the other hand. The seal 27 is preferably compressed between the force-transmitting plate 24 and a retaining ring 32 which abuts axially on the outside bearing ring 18.

The housing 8 is equipped with large-surface cooling ribs 33 in order to effectively discharge the heat which is produced during operation of the torque motor 6 to the atmosphere.

The brake caliper 1 must have a solid design to evenly introduce the actuating forces into the friction linings 4, 5. In order that a smaller amount of bending torques can be introduced by the friction linings 4, 5 into the housing 8 of the actuating unit 2, it is appropriate to configure the brake caliper 1 as a frame-type caliper. The result is that only tension forces are introduced into the housing so that the mounting support of the actuating unit 2 is not loaded by internal bending stress in the bearing seat.

A reduction of the necessary motor torque is achieved by appropriate integration of a planetary gear 46, 47, 48, 49, 50. The planetary gear which is interposed between the rotor 10 and the threaded nut 11 in terms of effect comprises a sun wheel 46 which is preferably provided by an externally toothed area 55 on the rotor 10, a plurality of planet wheels, one of which carrying reference numeral 47 is shown, and a hollow wheel 49 which is arranged in the brake caliper 1 and has an internal toothing 50. The rotor is mounted on the threaded nut 11 by way of a combination of a needle bearing 51 (shown schematically) and a ball bearing 52 whose radially outward running surface 53 is provided in the rotor 10, while its radially inward running surface 54 is shaped on the threaded nut 11. It is achieved by these provisions that a higher pitch of the spindle thread with a greater efficiency can be chosen.

To employ the electromechanically operable disc brake of the present invention in a control circuit which is required for application of the mentioned brakes in an automotive vehicle, there is provision of a force-measuring device 23 having signals $F_{Sp}$ which are sent to an electronic control circuit 26 (shown only schematically). The control circuit 26 which is also furnished with a brake force nominal value $F_{soll}$ predetermined by the vehicle driver produces actuating signals $I_{EM}$ for the electric motor 6. The force-measuring device 23 in the embodiment shown in FIG. 1 has the design of a force-measuring element 34 provided with four wire strain gauges 37 and configured as a threaded pin which closes the above-mentioned bore 35. This type of attachment permits easy replacement of the measuring device 23 or 34, respectively.

As can further be seen in the drawings, the bore 35 is preferably configured as a stepped bore, and the first spherical segment 42 includes two portions 56, 57 with diameters which correspond to those of the stepped bore so that correct guiding of the spherical segment 42 within the threaded spindle 14 is ensured. The above-mentioned push rod 41 is supported on the first portion 56 of large diameter, and the second portion 57 of smaller diameter is in a force-transmitting connection with an axial extension 36 of the threaded pin 34 or bears axially against its preferably calotte-type end. The wire strain gauges 37 (shown only schematically) are connected in a Wheatstone bridge. Two opposed wire strain gauges for the normal force measurement are arranged in the threaded pin, and the other two gauges are used for the temperature compensation. Connecting the wire strain gauges as a Wheatstone bridge permits compensating the effect of the high temperatures (up to 250° C.) which are produced during brakings operations on the individual wire strain gauges. However, another circuit connection wherein the four wire strain gauges are connected as two pairs in two Wheatstone bridges is also possible, and the two redundant bridges are appropriate for error detection on the force-measuring device, and reconfiguration by a plausibility check is possible. Further, force measurement is also possible by determining the variation of the voltage-responsive magnetic permeability (magnetostrictive effect) The use of the spherical segment 42 configured according to the present invention permits achieving that the normal force acting on the spherical segment 42 and the transverse force are separated and the transverse force portion is directed laterally into the threaded spindle 14, thereby preventing falsification of the measurement result.

Figure 2:
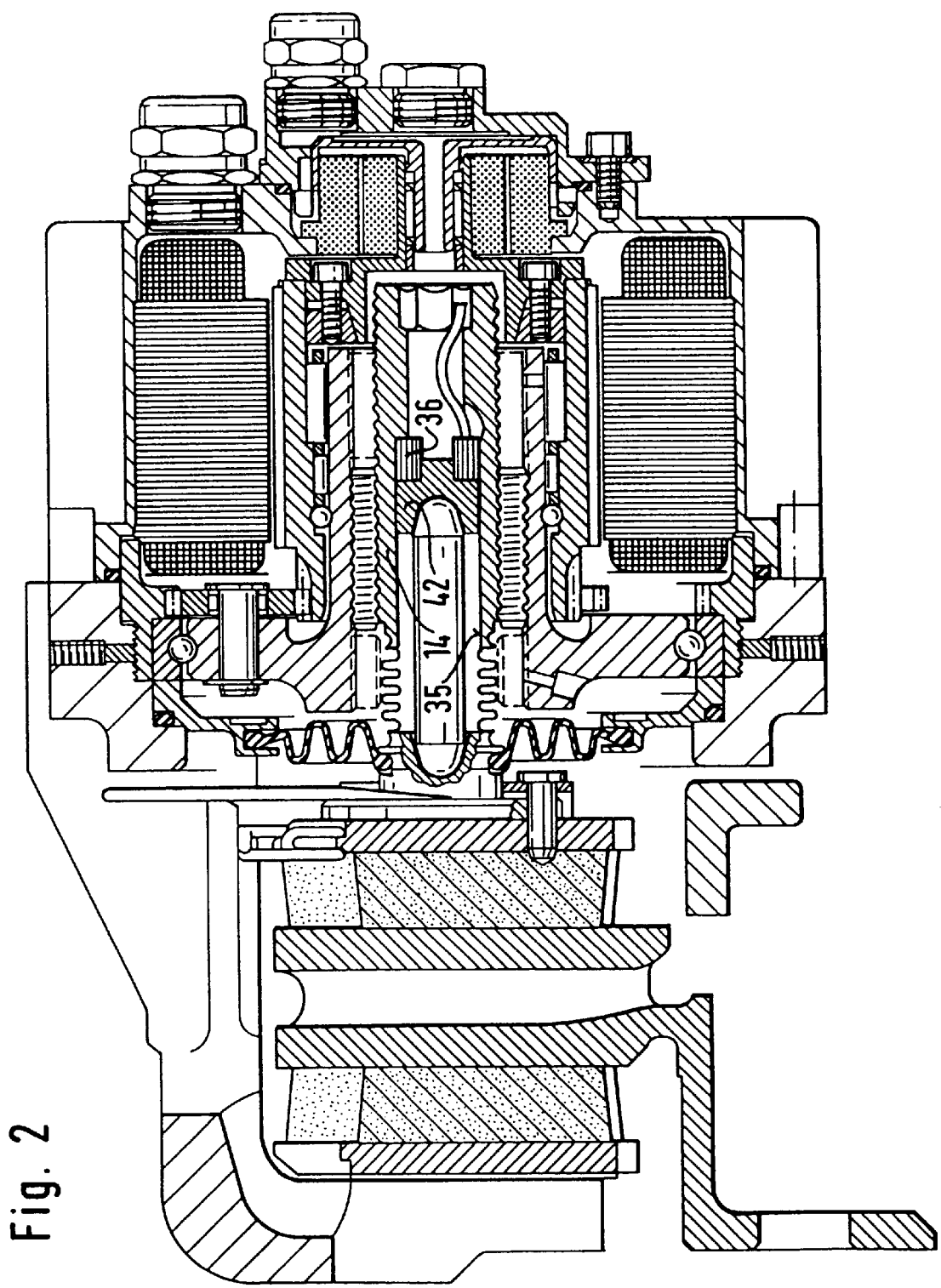
FIG. 2 is a representation corresponding to FIG. 1 of a second embodiment of the object of the present invention.

The above-mentioned force-measuring device is configured as a pressure gauge 36 in the embodiment of the object of the present invention shown in FIG. 2. It is preferred that the pressure gauge 36 is arranged so inside the bore 35 of the threaded spindle 14 that it transmits the clamping force generated by the threaded spindle 14 onto the spherical segment 42 upon operation of the disc brake of the present invention and thereby renders it possible to determine the force.

Figure 3:
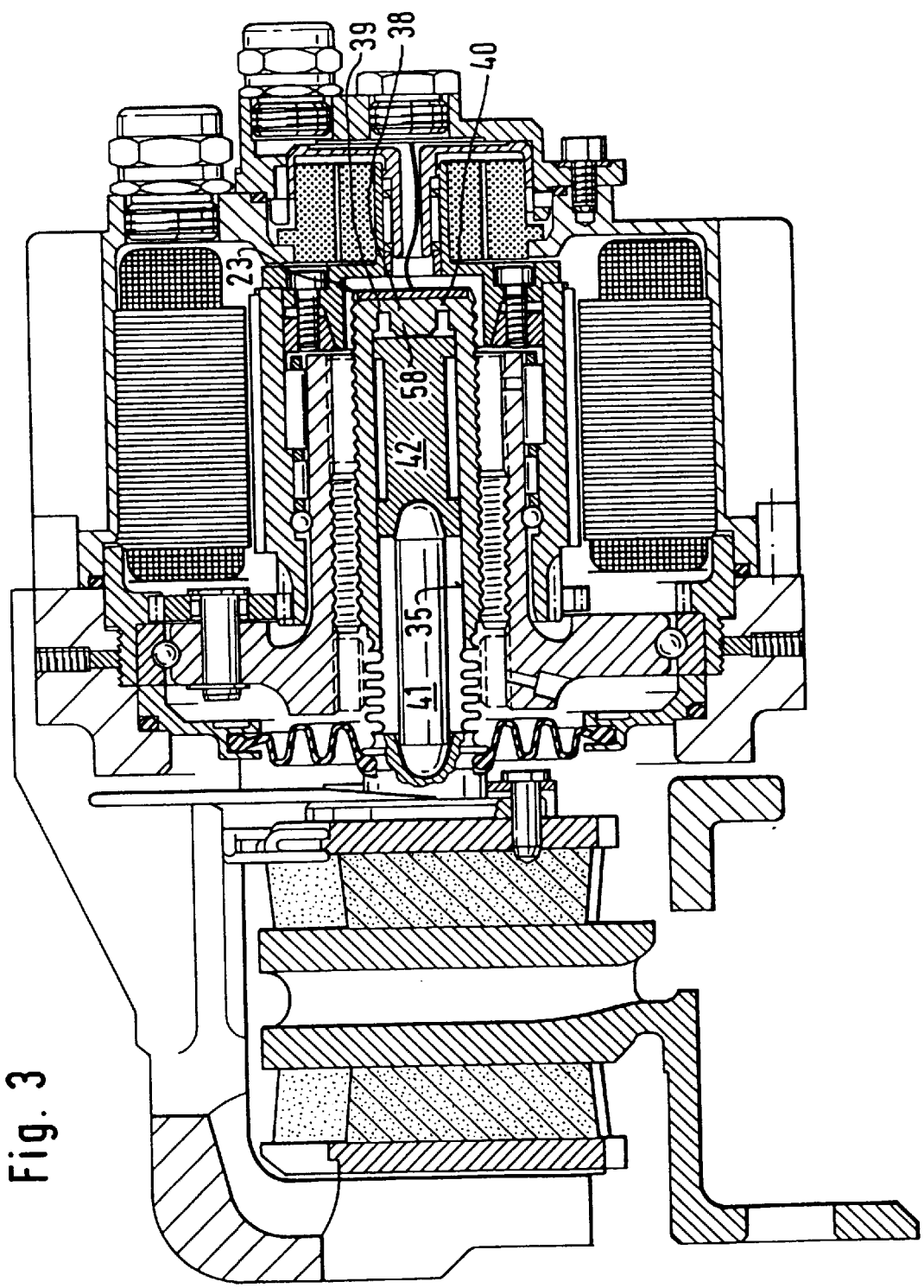
FIG. 3 is a representation corresponding to FIG. 1 of a third embodiment of the electromechanical disc brake according to the present invention.

In the embodiment of the present invention shown in FIG. 3, the force-measuring device 23 is provided in the area of a bottom 38 which closes the spindle bore 35. For this purpose, areas 39, 40 of a reduced material thickness are disposed in the bottom 38, and a force-transmitting element 58 is arranged in the middle. The above-mentioned pressure member 42 bears axially against the force-transmitting element 58 so that the areas 39, 40 are deformed when the push rod 41 is actuated. The material deformation can be sensed, for example, by way of wire strain gauges (not shown) which are cemented to the side of the bottom 38 remote from the pressure member 42.

List of Reference Numerals
1 brake caliper
2 actuating unit
3 brake disc
4 friction lining
5 friction lining
6 electric motor
7 reduction gear
8 housing
9 stator
10 rotor
11 threaded nut
12 thread roller
13 thread roller
14 spindle
15 extension
16 radial bearing
17 inside bearing ring
18 outside bearing ring
19 cylindrical roller
20 resolver
21 ring
22 ring
23 force-measuring device
24 force-transmitting plate
25 anti-rotation mechanism
26 control circuit
27 seal
28 holder means
29 permanent magnet segment
30 actuating element
31 cover
32 retaining ring
33 cooling rib
34 force-measuring element
35 bore
36 pressure gauge
37 wire strain gauge
38 bottom
39 area
40 area
41 push rod
42 spherical segment
43 spherical segment
44 extension
45 pleated bellows
46 sun wheel
47 planet wheel
48 ring
49 hollow wheel
50 internal toothing
51 needle bearing
52 ball bearing
53 running surface
54 running surface
55 area
56 portion
57 portion
58 force-transmitting element

What is claimed is:

1. Electromechanically operable disc brake caliper assembly for automotive vehicles comprising:
   a brake caliper,
   an electrically powered actuating unit arranged on the brake caliper,
   a force-measuring device interposed in a flux of force generated by said electrically powered actuating unit, wherein the output signals of the force-measuring device are adapted to be sent to a control circuit which influences the current supplied to the electrically powered actuating unit further including a reduction gear interposed between said electrically powered actuating unit and said brake caliper, wherein the reduction gear has a threaded nut on which the force-measuring device is arranged.

2. Electromechanically operable disc brake caliper assembly as claimed in claim 1, wherein the force-measuring device is physically located in the caliper.

3. Electromechanically operable disc caliper assembly as claimed in claim 1, wherein the force-measuring device is arranged in or on a bearing assembly which accommodates the force produced by the actuating unit.

4. Electromechanically operable disc brake as claimed in claim 1, wherein the force-measuring device is arranged between the actuating element and a friction lining member associated with said actuating element.

5. Electromechanically operable disc brake as claimed in claim 1, wherein the force-measuring device is arranged between the brake caliper and a friction lining member operable by the effect of a reaction force that is produced by the brake caliper.

6. Electromechanically operable disc brake as claimed in claim 4, wherein the force is transmitted between a reduction gear and the friction lining by way of a push rod, and in that the force-measuring device is arranged on the push rod.

7. Electromechanically operable disc brake as claimed in claim 1, wherein the force-measuring device is configured as a force-measuring element which includes at least one wire strain gauge.

8. Electromechanically operable disc brake as claimed in claim 1, wherein the force-measuring device is configured as a force-measuring element operating with magnetostrictive effect.

9. Electromechanically operable disc brake as claimed in claim 1, wherein the force-measuring device is configured as a force-measuring element operating with piezoelectrical effect.

10. Electromechanically operable disc brake as claimed in claim 1, wherein the force-measuring device is configured as a force-measuring element operating with capacitive effect.

11. Electromechanically operable disc brake as claimed in claim 1, wherein the force-measuring device is configured as a pressure gauge.

12. Electromechanically operable disc brake as claimed in claim 1, wherein the reduction gear is configured as a roller-and-thread drive having a spindle which forms the actuating element and actuates the friction lining by way of a push rod which is mounted in a pressure member that is slidable in the spindle and is in a force-transmitting connection with the force-measuring device.

13. Electromechanically operable disc brake as claimed in claim 12, wherein the spindle includes a bore in which the pressure member is slidably guided and on the end of which the force-measuring element is arranged.

14. Electromechanically operable disc brake as claimed in claim 12, wherein the spindle has a through-bore in which the pressure member is slidably guided, and the bore is closed by the force-measuring element.

15. Electromechanically operable disc brake as claimed in claim 14, wherein the bore is configured as a stepped bore, and in that the pressure member comprises two portions of different diameters, and the push rod is supported on the portion of large diameter, and the portion of smaller diameter bears against the force-measuring element.

16. Electromechanically operable disc brake as claimed in claim 1, wherein the force-measuring element has an axial extension which carries at least one wire strain gauge and the end of which has a calotte-type design.

17. Electromechanically operable disc brake as claimed in claim 1, wherein the force-measuring element has an axial extension which is equipped with coils for establishing the magnetostrictive effect.

18. Electromechanically operable disc brake as claimed in claim 16, wherein the at least one wire strain gauge includes at least two wire strain gauges that are connected in at least one full or semi Wheatstone bridge.

19. Electromechanically operable disc brake as claim in claim 12, wherein the force-measuring device is arranged at the end of the spindle.

20. Electromechanically operable disc brake as claimed in claim 19, wherein the force-measuring device is provided in a bottom which closes the bore of the spindle.

21. Electromechanically operable disc brake as claimed in claim 20, wherein the force-measuring device is provided by areas having a reduced material thickness which cooperate with wire strain gauges to evaluate their deformation.

* * * * *

UNITED STATES PATENT AND TRADEMARK OFFICE
CERTIFICATE OF CORRECTION

PATENT NO. : 6,230,854 B1
DATED : May 15, 2001
INVENTOR(S) : Ralf Schwarz; Peter Killian; Martin Semsch; Holger Kranlich; Stefan Schmitt It is certified that error appears in the above-identified patent and that said Letters Patent is hereby corrected as shown below:

<u>Column 8, claim 19,</u>
Line 10, change "disc brake as claim" to -- disc brake as claimed --.

Signed and Sealed this

Twenty-sixth Day of March, 2002

JAMES E. ROGAN
*Director of the United States Patent and Trademark Office*

*Attest:*

*Attesting Officer*